United States Patent
Belon et al.

(10) Patent No.: US 9,739,608 B2
(45) Date of Patent: Aug. 22, 2017

(54) ROTATION SENSOR FOR AN ELECTRICAL BIKE PEDAL

(71) Applicant: BELON ENGINEERING, INC., San Diego, CA (US)

(72) Inventors: Juan Bautista Belon, San Diego, CA (US); Hsin-Chih Chen, Taiwan (CN)

( * ) Notice: Subject to any disclaimer, the term of this patent is extended or adjusted under 35 U.S.C. 154(b) by 208 days.

(21) Appl. No.: 14/378,936

(22) PCT Filed: Apr. 9, 2013

(86) PCT No.: PCT/US2013/035845
§ 371 (c)(1),
(2) Date: Aug. 14, 2014

(87) PCT Pub. No.: WO2013/155112
PCT Pub. Date: Oct. 17, 2013

(65) Prior Publication Data
US 2015/0053494 A1    Feb. 26, 2015

Related U.S. Application Data

(60) Provisional application No. 61/621,996, filed on Apr. 9, 2012.

(51) Int. Cl.
*B62M 6/50* (2010.01)
*G01L 3/14* (2006.01)
*G01P 3/00* (2006.01)
*G01B 21/22* (2006.01)
*G01B 7/30* (2006.01)
*G01D 5/14* (2006.01)
*B62M 3/00* (2006.01)
*B62M 6/60* (2010.01)
*B60L 11/00* (2006.01)
*B60L 11/18* (2006.01)

(52) U.S. Cl.
CPC ............ *G01B 21/22* (2013.01); *B60L 11/007* (2013.01); *B60L 11/1805* (2013.01); *B62M 3/00* (2013.01); *B62M 6/50* (2013.01); *B62M 6/60* (2013.01); *G01B 7/30* (2013.01); *G01D 5/14* (2013.01); *G01P 3/00* (2013.01); *B60L 2200/12* (2013.01); *B60L 2250/26* (2013.01); *Y02T 10/7005* (2013.01); *Y02T 90/16* (2013.01)

(58) Field of Classification Search
CPC ........... A63B 69/16; B62M 6/45; B62M 6/50; B62M 6/90; B62M 6/15; G01L 3/14; G01L 3/24; G01L 5/00
USPC ........................... 180/206.2, 206.3; 74/594.1
See application file for complete search history.

(56) References Cited

U.S. PATENT DOCUMENTS

| 5,202,627 A * | 4/1993 | Sale ................ G01P 3/489 324/166 |
| 5,992,553 A * | 11/1999 | Morrison ............ B62M 6/45 180/206.2 |
| 6,247,548 B1 * | 6/2001 | Hayashi ............ B60L 11/1801 180/206.2 |

(Continued)

FOREIGN PATENT DOCUMENTS

| CN | 102072792 A | 5/2011 | |
| WO | 2011/021164 | * 2/2011 | ............ B62M 6/60 |

*Primary Examiner* — Anne Marie Boehler
(74) *Attorney, Agent, or Firm* — Mark Huebscher TechLaw LLP

(57) ABSTRACT

A device for detecting rotation of a bicycle pedal mechanism and communicating that information to an electronic bicycle wheel motor controller.

10 Claims, 8 Drawing Sheets

(56) References Cited

U.S. PATENT DOCUMENTS

| | | | | |
|---|---|---|---|---|
| 8,091,674 B1* | 1/2012 | Zhang | ................. | B62M 6/50 |
| | | | | 180/205.1 |
| 8,550,199 B2* | 10/2013 | Moeller | ................. | B62M 6/45 |
| | | | | 180/206.3 |
| 2003/0163287 A1 | 8/2003 | Vock et al. | | |
| 2007/0151322 A1* | 7/2007 | Steinich | ................. | G01D 5/145 |
| | | | | 73/1.75 |
| 2008/0200079 A1* | 8/2008 | Jansen | ................. | B63H 16/14 |
| | | | | 440/1 |
| 2010/0093494 A1 | 4/2010 | Smith | | |
| 2011/0067503 A1 | 3/2011 | Roudergues et al. | | |
| 2011/0278909 A1 | 11/2011 | Chen et al. | | |
| 2012/0247853 A1* | 10/2012 | Hashimoto | ............. | B62M 6/55 |
| | | | | 180/206.3 |
| 2012/0261978 A1* | 10/2012 | Lu | ............. | B62M 6/45 |
| | | | | 301/6.5 |

\* cited by examiner

ROTATION SENSOR FOR AN ELECTRICAL BIKE PEDAL

CLAIM OF PRIORITY

This application is a U.S. National Stage Filing under 35 U.S.C. 371 from International Patent Application Serial No. PCT/US2013/035845, filed Apr. 9, 2013, and published on Oct. 17, 2013 as WO 2013/155112 A1, which claims the benefit of priority to U.S. Provisional Patent Application No. 61/621,996, filed Apr. 9, 2012, the contents of which are incorporated herein by reference in their entireties.

FIELD OF THE INVENTION

The present invention pertains to hybrid bicycles and, more particularly, to retrofitting conventional bicycles to convert them to hybrid bicycles by use of a specialized, quick-mount pedaling sensor.

BACKGROUND

Numerous electrically powered bicycles and hybrid bicycles currently exist within the marketplace. Hybrid, as used herein, refers to bicycles or vehicles that are powered using multiple power sources. A hybrid bicycle, as used herein, refers to bicycles that have an electrical power source plus at least one other power source to drive one or more wheels. Typically, the electrical power source is a battery that drives an electric motor. The secondary power source is usually human power, transmitted to the wheels via the bicycle pedals.

Kits are currently available that can be used to retrofit conventional, manually powered bicycles into either electrically powered or hybrid powered bicycles. In many cases, assembly of these kits takes time and some customers are discouraged with the time needed as well as the technical expertise and tools required to complete the assembly.

As a safety measure, some countries require hybrid or electric bicycles to include an override function that removes power from the electric motor. In keeping with safety, a hands-free system is desirable to accomplish the override so that the rider can keep their eyes trained on the road rather than searching for a button or switch. Thus, there is a need for an assembly that can detect a user input that removes power from the electric motor driving the wheel or wheels of a hybrid or electrical bicycle, can easily retrofit conventional bicycles, and does not require the use of hands.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of various embodiments, a device for detecting rotation of a member is provided, the device comprising: a member attachment bracket; a rotation sensor providing an electronic measurement of angular position; a battery system operably connected to the rotation sensor; a transmitter to electronically transmit the electronic measurement.

In one aspect of various embodiments, a communication apparatus for detecting bicycle pedal rotation is provided, the apparatus comprising: a pedaling mechanism attachment bracket; a rotation sensor removably attached to the pedaling mechanism attachment bracket, wherein the rotation sensor provides an electronic measurement of bicycle pedal rotation; a battery system operably connected to the rotation sensor; a transmitter for transmitting the electronic measurement of bicycle pedal rotation; and a wheel assembly comprising a motor, a battery system, a receiver for receiving the electronic measurement of bicycle pedal rotation, and a control mechanism, wherein the control mechanism is configured to receive the electronic measurement of bicycle pedal rotation, and wherein the control mechanism having at least one input from a battery system.

In one aspect of various embodiments, a device for detecting rotation of a member is provided, the device comprising: means for removably attaching the device to the member; means for adjustment to fit different member sizes; means for measuring an angular position of the member; means for removably attaching the angular position measuring means from the device attachment means; and means for transmitting the angular position of the member.

DETAILED DESCRIPTION

In the following detailed descriptions of various embodiments, reference is made to the accompanying drawings that form a part hereof, and in which is shown, by way of illustration, specific embodiments that may be practiced. It is to be understood that other embodiments may be utilized and structural changes may be made without departing from the scope of the present disclosure.

Figure 1:
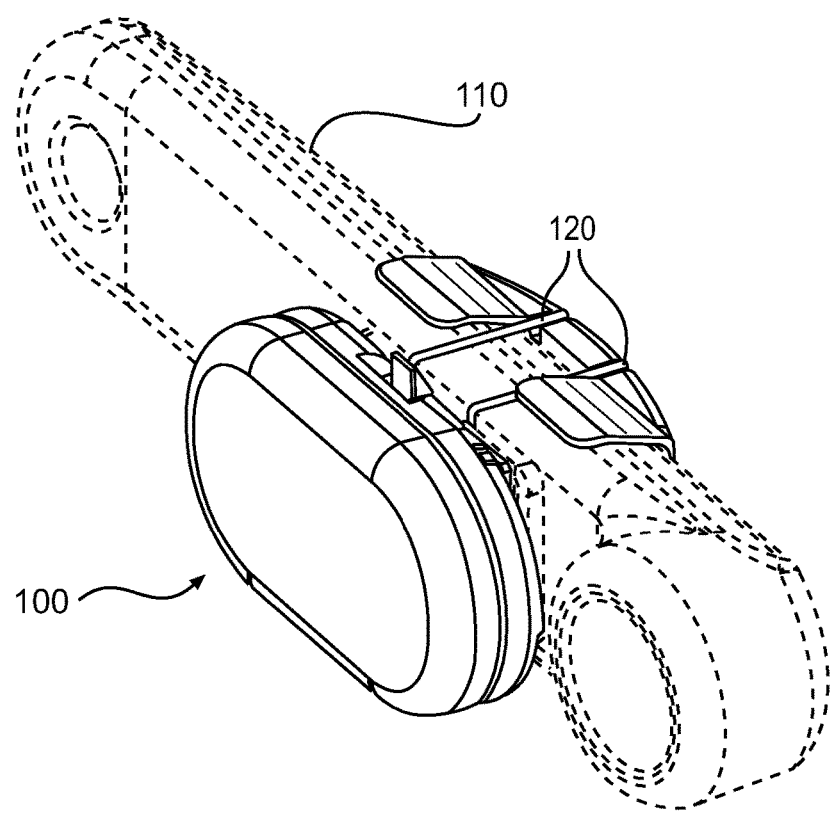
FIG. 1 is a perspective view of an embodiment apparatus for detecting rotation of a member.

FIG. 1 is an illustration of an embodiment apparatus for detecting rotation of a member 100 attached to a conventional bicycle crank 110, hereinafter also referred to as a member or a radial crank member, though the embodiment apparatus 100 may be attached to any member where a user requires detection of rotation. The broken line showing of the crank 110 is for the purpose of illustrating environmental structure and forms no part of the claimed design. At least one strap 120 may be secured around the crank 110 and around the apparatus 100 enabling quick installation and fit most crank types.

Figure 2:
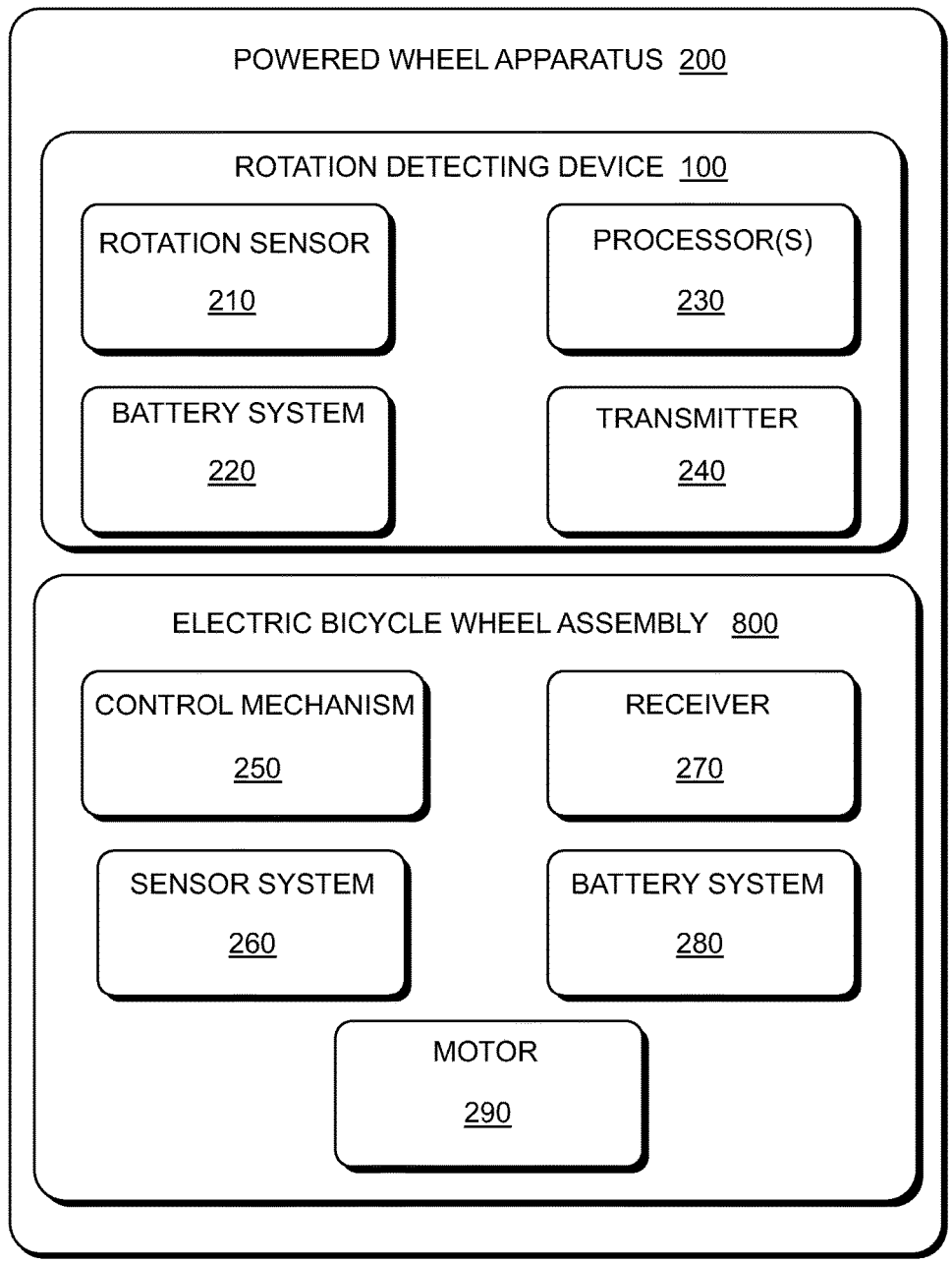
FIG. 2 is a block diagram of an embodiment communication apparatus.

FIG. 2 is an embodiment communication apparatus 200 with attendant hardware such as sensors, transmitters, receivers, battery systems, processors, etc. A person having ordinary skill in the art will appreciate that the embodiment communication apparatus may include more, less, or different components and modules than the ones illustrated, which are shown merely as one example. Therefore, modifications, changes, and different configurations may be made without departing from the spirit and scope of this disclosure.

In an embodiment, the communication apparatus 200 has at least one master unit and at least one slave unit. The master unit and slave unit may wirelessly communicate. Wireless communication may be achieved through visible light, infrared light, ultrasonic, radio, microwave, electromagnetic induction, and so forth. At least one master unit may be mounted within the wheel assembly 800, on bicycle handlebars (not shown), on the steering mechanism (not shown), or on some other part of a vehicle (not shown). At least one slave unit is mounted on a part of the vehicle requiring rotary sensing, such as the pedal crank 110.

In an embodiment, the slave unit is an embodiment of a rotation detection device 210 which may be mounted on a pedal mechanism of a bicycle, such as the radial crank member 110. The apparatus 100 may comprise one or more modules to power the apparatus, measure rotation, produce an electronic signal, process the electronic signal, and transmit the electronic signal. The slave unit may be powered by a battery system 220 or some other wireless power delivery system, such as magnetic field induction, and so forth. The slave unit may be connected via wires or cables to a remotely mounted power delivery system (not shown).

In addition to the battery system 220, a rotation sensor 210 is provided to detect when the bicycle crank 110 rotates. The rotation sensor 210 may be connected to the battery system 220 directly or indirectly. In an embodiment, the rotation sensor 210 detects the rotation of a bicycle crank 110. Upon detecting rotation, the sensor 210 measures the amount of rotation and produces an electronic signal correlating to rotational speed. The electronic signal may be analog or digital.

In an embodiment, the rotation sensor 210 may be operably connected to one or more processors 230. The electronic signal may be conditioned by the one or more processors 230 or the electronic signal may be transmitted via a transmitter 240 directly to the master unit. The transmitted signal may be analog or digital. The one or more processor 230 may condition the electronic signal using computing instructions, such as embedded firmware. The computing instructions may include a filter, such as a time-averaged sampling method, that may be used to eliminate unwanted vibrational noise, electrical noise, or other sources of noise. In time-averaged sampling, an electronic signal amplitude may be measured and may be stored by the one or more processors 230 over a discrete amount of time, a discrete amount of rotation, or both and then averaged. If the average reaches an upper or lower threshold, then the one or more processors 230 may transmit, or discontinue transmitting, a signal. Quantizing the time or rotation required to obtain a minimum data sample may vary depending on the type and speed of the processor 230, the rotation sensor 210. In an embodiment, the rotation sensor 210 may travel 60 degrees or more before acquiring enough data samples. This relatively large travel may be supported by empirical data that shows the maximum cranking speed that a human can comfortably generate is approximately 2 Hz before the user's feet begin to slip off the pedal. With this relatively low rotation frequency, more data samples would be required as processor 230 speed decreases or computing time increases.

In an embodiment, the electronic signal may be conditioned using a filter such as low-pass filter, high-pass filter, band-pass filter, and so forth. The filter may use electronic hardware as in a resistor-capacitor (RC) type, resistor-inductor-capacitor (RLC) type, and so forth. The electronic hardware filter may be used in conjunction with the aforementioned software filter.

In an embodiment, the master unit is an electric bicycle wheel assembly 800. Such an assembly may comprise a battery system 280, a motor 290, a control mechanism 250, a sensor system 260, and a receiver 270.

In an embodiment, the receiver 270 is configured to receive slave unit signals such as those sent by the transmitter 240. The control mechanism 250 may set a threshold for which no action is taken if the electronic signal from the slave unit apparatus for detecting rotation 100 is too low or too high. Alternatively, the one or more processors 230 in the slave unit apparatus for detecting rotation 100 may prevent a signal transmission if the electronic measurement from the rotation sensor 210 is above or below a threshold.

In an embodiment, power to the motor 290 may be removed by the control mechanism 250 when the rotation sensing device 100 measures a signal above a predetermined threshold, such as 100 mV. Alternatively, power to the motor 290 may be removed when the device 100 measures a signal below a predetermined threshold.

Figure 3:
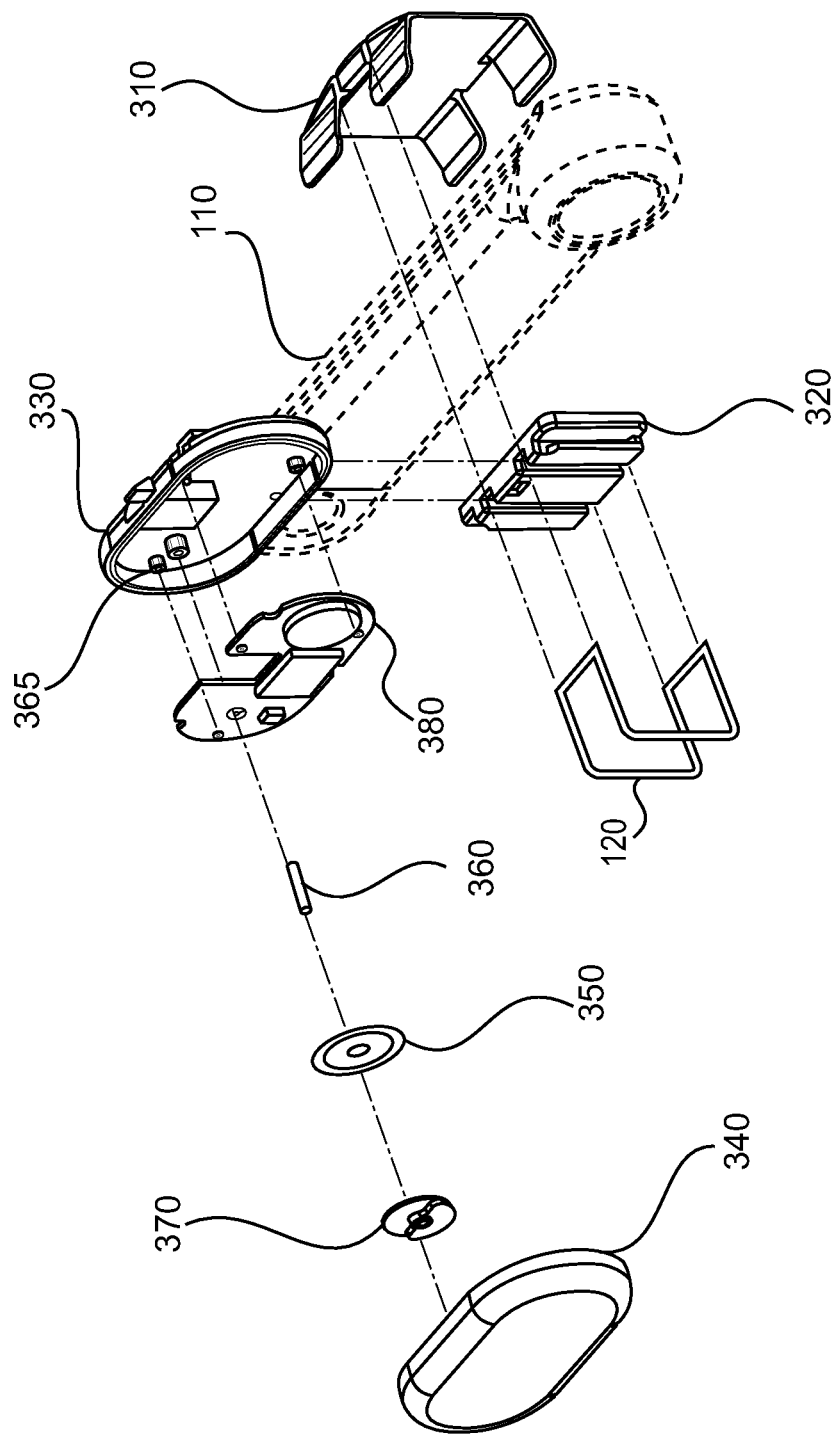
FIG. 3 is an exploded view of FIG. 1.

Turning now to FIG. 3, an exploded view of an embodiment rotation detection apparatus 100 is shown. The broken line showing of the crank 110 is for the purpose of illustrating environmental structure and forms no part of the claimed design. The member, a conventional bicycle crank 110, is also shown to provide perspective on the mounting of the apparatus 100 thereto. This mounting may be achieved by a member attachment bracket 310 and a mounting seat 320. The mounting seat 320 may be configured to allow easy removal of the rotation detection device 100 for purposes such as cleaning, recharging or replacement of the battery 620, and so forth.

In an embodiment, the member attachment bracket 310 and mounting seat 320 are strapped together via a continuous loop strap 120 with the bicycle crank 110 sandwiched therebetween. The loop strap 120 may lie within channels of the mounting seat 320 with the ends of the loop wrapping around and engaging tabs on the bracket 310. Alternatively, the member attachment bracket 310 and mounting seat 320 may be attached via multiple continuous straps, non-continuous straps such as those with a hook and clasp, a hose clamp, Velcro®, adhesive tape, and so forth.

In an embodiment, the rotation detection apparatus 100 may be enclosed by a single piece or multi-piece housing. FIG. 3. shows a multi-piece housing comprised of a base cover 330 and an outer cover 340. The base cover 330 and outer cover 340 may be permanently joined with adhesive, heat weld (if the housing is made from plastic), and so forth. However, it may be advantageous to removably join the covers if the battery 620 is not rechargeable, such as by using screws, an interference fit, deformable clips, and so forth. The overall thickness of the rotation detection apparatus 100 may be limited by the designs of the bicycle frame and crank 110 because the apparatus 100 should be enabled to freely pass the frame and the user's leg as the crank 110 rotates.

In an embodiment, the rotation sensor may be a rotary encoder 350. The rotary encoder 350 may be an incremental type or an absolute type. Absolute type rotary encoders are better suited to measure angular position whereas incremental type rotary encoders are better for detecting rotary motion. Generally, incremental type encoders are less expensive than absolute type, which is why they are widely used in many consumer electronic devices such as a stereo volume knob or a computer mouse. If an incremental encoder is used to detect rotation of a bicycle pedal, a quadrature output may be used because forward or reverse direction may be detected. Direction is important because only a forward direction of pedal rotation should enable the motor control mechanism 250 to provide power to the motor 290. Generally, pedaling a bicycle in reverse either applies the rear brake or decouples the crank from the drivetrain. Thus, the desired effect of reverse pedaling is to reduce or stop forward momentum, or to simply move the pedal to a desired position without applying mechanical power to the wheel. It would be counterintuitive to apply motor power in a reverse pedaling situation.

A quadrature incremental encoder has two output wave forms that are 90 degrees out of phase, designated by A and B. The quadrature waveforms can be square or sinusoidal. These waveform signals are decoded to produce a count-up pulse or a count-down pulse. For decoding in software, the A and B signals are read by software via an interrupt on any edge (leading or trailing). ON and OFF states, represented in software as 0 and 1, are assigned to A and B differently at each 90 phase. A state diagram for coding clockwise rotation may be:

| Phase | Signal A | Signal B |
|-------|----------|----------|
| 1     | 0        | 0        |
| 2     | 0        | 1        |
| 3     | 1        | 1        |
| 4     | 1        | 0        |

Clockwise direction is, thus, decoded as the one or more processor 230 reads signal A and signal B as consecutive values of 00, 01, 11, and then 10. Counterclockwise direction is coded in the following manner:

| Phase | Signal A | Signal B |
|-------|----------|----------|
| 1     | 1        | 0        |
| 2     | 1        | 1        |
| 3     | 0        | 1        |
| 4     | 0        | 0        |

Counterclockwise direction is, thus, decoded as the one or more processor 230 reads signal A and signal B as consecutive values of 10, 11, 01, and then 00.

In an embodiment, an eccentric mass 370 may be coupled to the encoder shaft 360 either directly, as illustrated in FIG. 3, or indirectly through gearing (not shown). The eccentric mass 370 may be biased with respect to the center axis, i.e. the 370 moment of inertia of the eccentric mass is not coincident with the axis about which the encoder shaft 360 rotates. The eccentric mass 370 may consist of a dense material such as steel, brass, and so forth to minimize total size. Through experimentation, the moment created by the eccentric mass may be between 10 gram-inch to 300 gram-inch in order to reduce noise caused by road vibrations. Additionally, an eccentric mass 370 between the aforementioned range may also react to discontinued pedaling within a time of approximately 100 ms, as required by some jurisdictions as a safety feature. The eccentric mass 370 may be joined to an encoder shaft 360 which in turn may be joined to the base cover 330. Additionally, the rotary encoder 350 may share the encoder shaft 360 with the eccentric mass 370. In this manner, the encoder 350 detects rotation of the bicycle crank 110 by gravity causing the eccentric mass 370 to maintain its orientation with reference to ground as the crank rotates. The relatively fixed position of the eccentric mass 370 causes the encoder shaft 360 to rotate in tandem with the bicycle crank 110 as it rotates. The axis of the encoder shaft 360 may be located within, and be concentric with, a round hole 365 of a base cover 330, outer cover 340, both, or neither. The hole 365 may comprise a low friction material or a low friction coating to allow the encoder shaft 360 to spin freely. Other methods may be employed to enable low friction rotation such as a ball bearing.

In another embodiment, the rotation sensor may be an electric generator 350 with an eccentric mass 370, where the eccentric mass 370 is joined to a shaft 360. As the bicycle crank 110 rotates, the eccentric mass 370 maintains its reference orientation to ground which causes the shaft 360 to rotate. A voltage is then generated by rotation of the shaft 360, which can be used to detect rotation of the bicycle crank 110.

Figure 4:
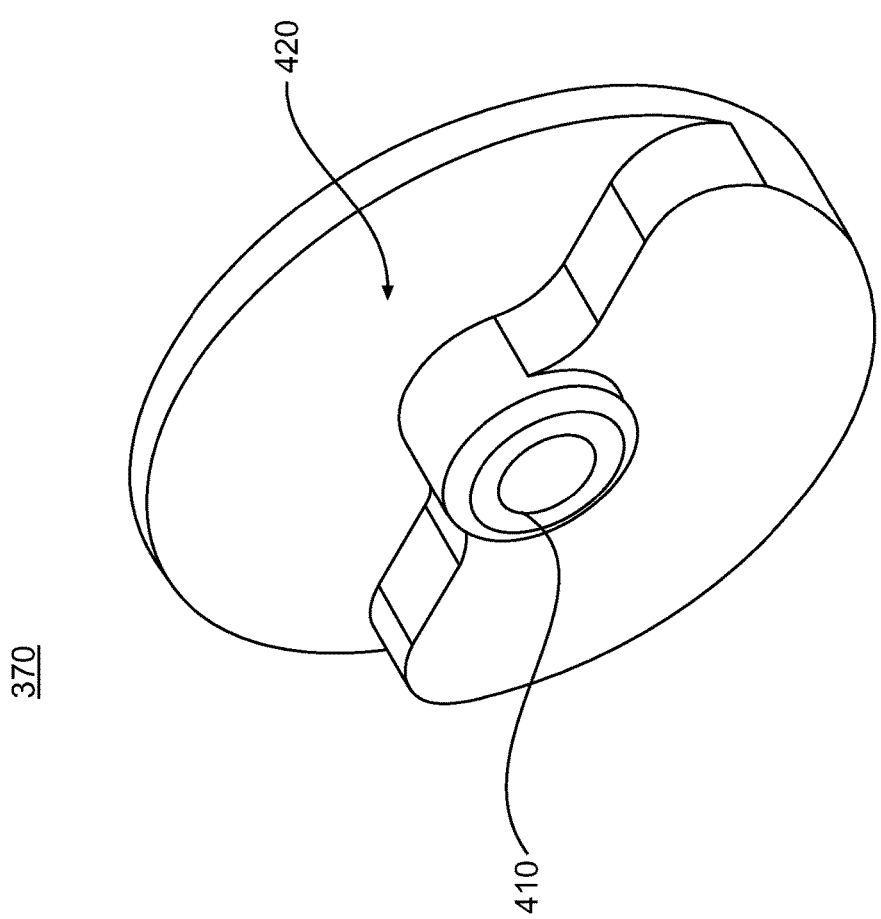
FIG. 4 is an embodiment eccentric mass.

In FIG. 4, an embodiment eccentric mass 370 is shown in more detail than in FIG. 3. Though the eccentric mass 370 is depicted as a cylinder, it may be of any shape in order to produce an offset between the centroid moment of inertia and the axis of spin 410. With this offset, gravitational force will produce a torque and cause the eccentric mass 370 to rotate. One method to relocate the centroid moment of inertia is to remove a portion of a cylinder 420. A person having ordinary skill in the art will appreciate that the embodiment eccentric mass 370 may include more, less, or different shapes than the one illustrated, which is shown merely as one example. Therefore, modifications, changes, and different configurations may be made without departing from the spirit and scope of this disclosure.

Figure 5:
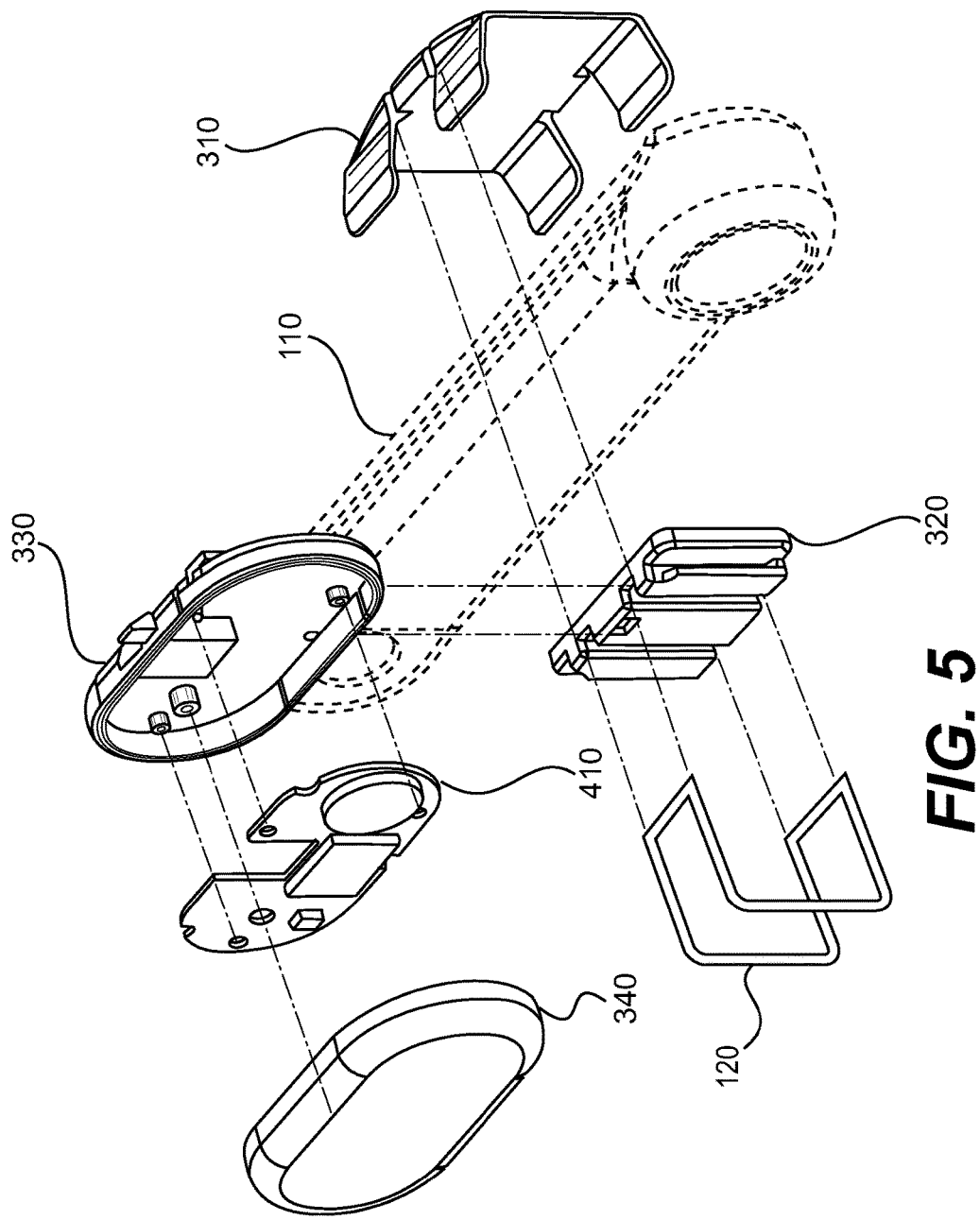
FIG. 5 is an exploded view of another embodiment apparatus for detecting rotation of a member.

FIG. 5 is provided to illustrate one of several possible alternate embodiments of an apparatus for detecting rotation of a member. Again, the embodiment apparatus 100 is attached to a conventional bicycle crank 110. The broken line showing of the crank 110 is for the purpose of illustrating environmental structure and forms no part of the claimed design. The same member attachment bracket 310 is shown for simplicity, but may be of many different shapes to removably attach to the crank 100. The same mounting seat 320 is also shown for simplicity, as are the base cover 330 and outer cover 340. A circuit board assembly 410 is shown with a rotation sensor 210 mounted to the board. See FIG. 6 for more detail. The sensor 210 may be an accelerometer of the piezoelectric type, piezoresistive type, capacitive type, MEMS, and so forth. As an illustrative example, the capacitive type may be used because of its superior low frequency performance, stability, and linearity. Capacitive accelerometers sense a change in electrical capacitance with respect to acceleration to vary the output of an energized electrical circuit. As the crank 110 rotates, the accelerometer 210, which may be linear-type, produces peak voltages coinciding with the upward and downward motion of the crank 110. After taking the absolute value, the peak voltages between the upward and downward cycle may have an offset caused by gravity. As the member 110 rotates, the accelerometer 210 may measure the change in angular velocity of the rotating crank 110 as the change in upward and downward acceleration; i.e. from less than zero to zero or from zero to greater than zero.

Figure 6:
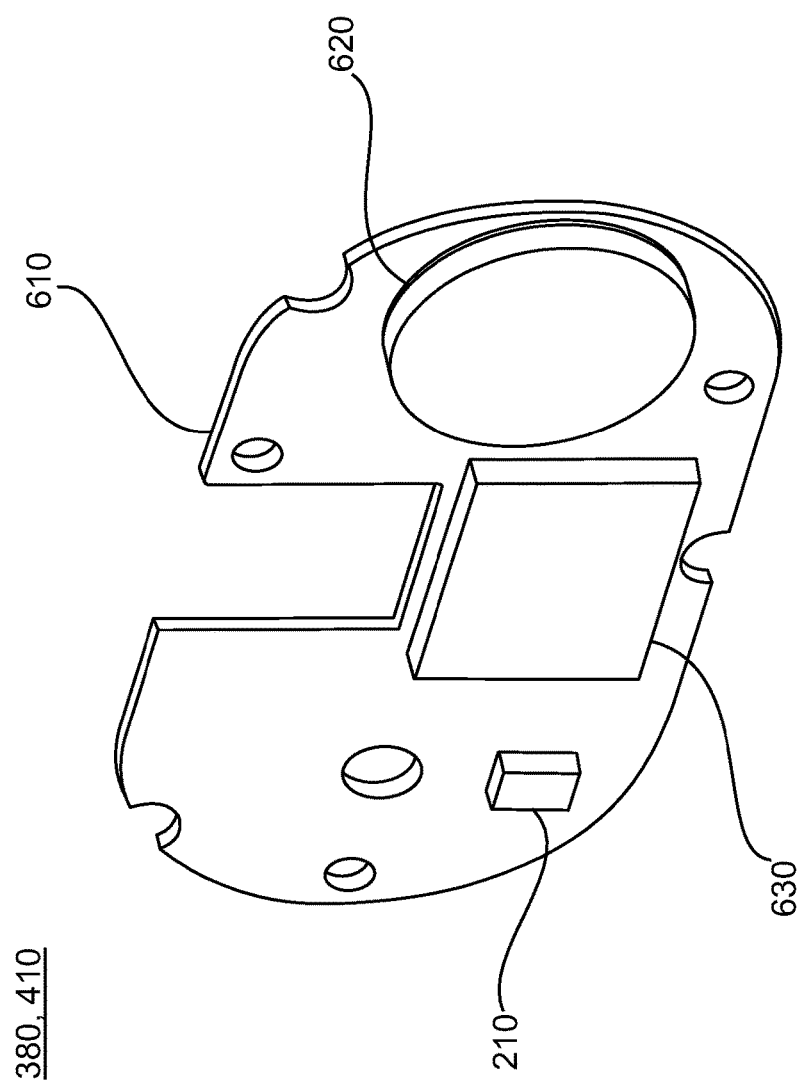
FIG. 6 is a perspective view of an embodiment rotation sensor electronics assembly.

In FIG. 6, the embodiment circuit board assembly 380, 410 is illustrated in more detail. In an embodiment, the circuit board 610 may be fiberglass or such other material commonly known to those skilled in the art. The circuit board may consist of at least one layer of copper strands, also known as traces, to connect various electronic components.

In an embodiment, the circuit board assembly 380, 410 may include one or more processors 630, a transmitter (not shown), and other electronic components. A person having ordinary skill in the art will appreciate that the embodiment circuit board assembly 380, 410 may include more, less, or different electrical components than the one illustrated, which is shown merely as one example. Therefore, modifications, changes, and different configurations may be made without departing from the spirit and scope of this disclosure.

In another embodiment, the processor 630 may execute programmed logic in order to reduce battery power consumption, determine the minimum electronic measurement required to transmit (such as 100 mV), and so forth.

Figure 7:
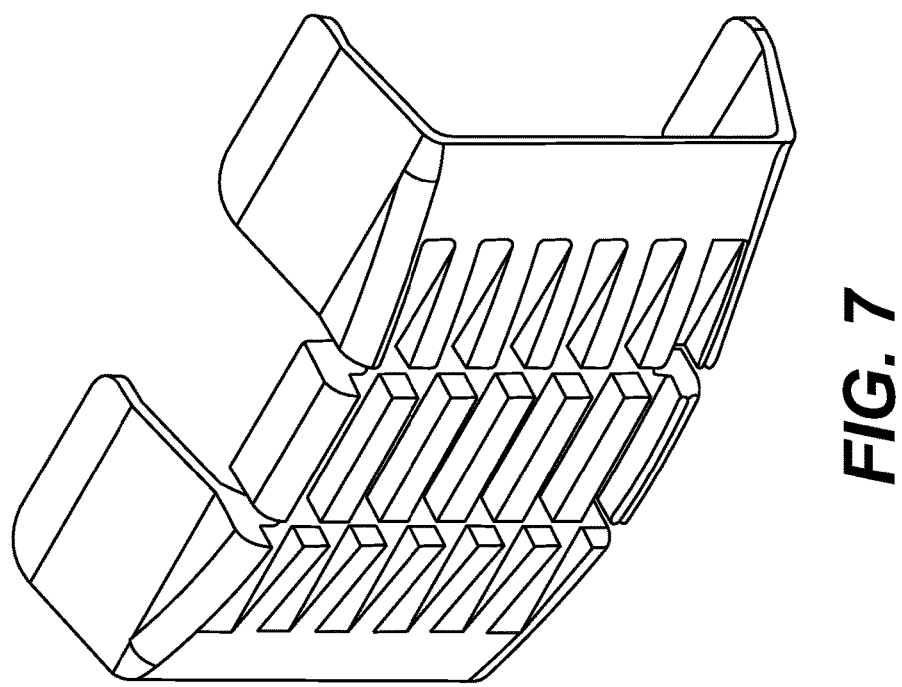
FIG. 7 is a perspective view of the reverse side of an embodiment member attachment bracket.

FIG. 7 is a perspective view of the reverse side of an embodiment member attachment bracket 700. The bracket 700 may be plastic, metal, fiberglass, or other material which rigidly secures the apparatus 100 to the crank 110.

Figure 8:
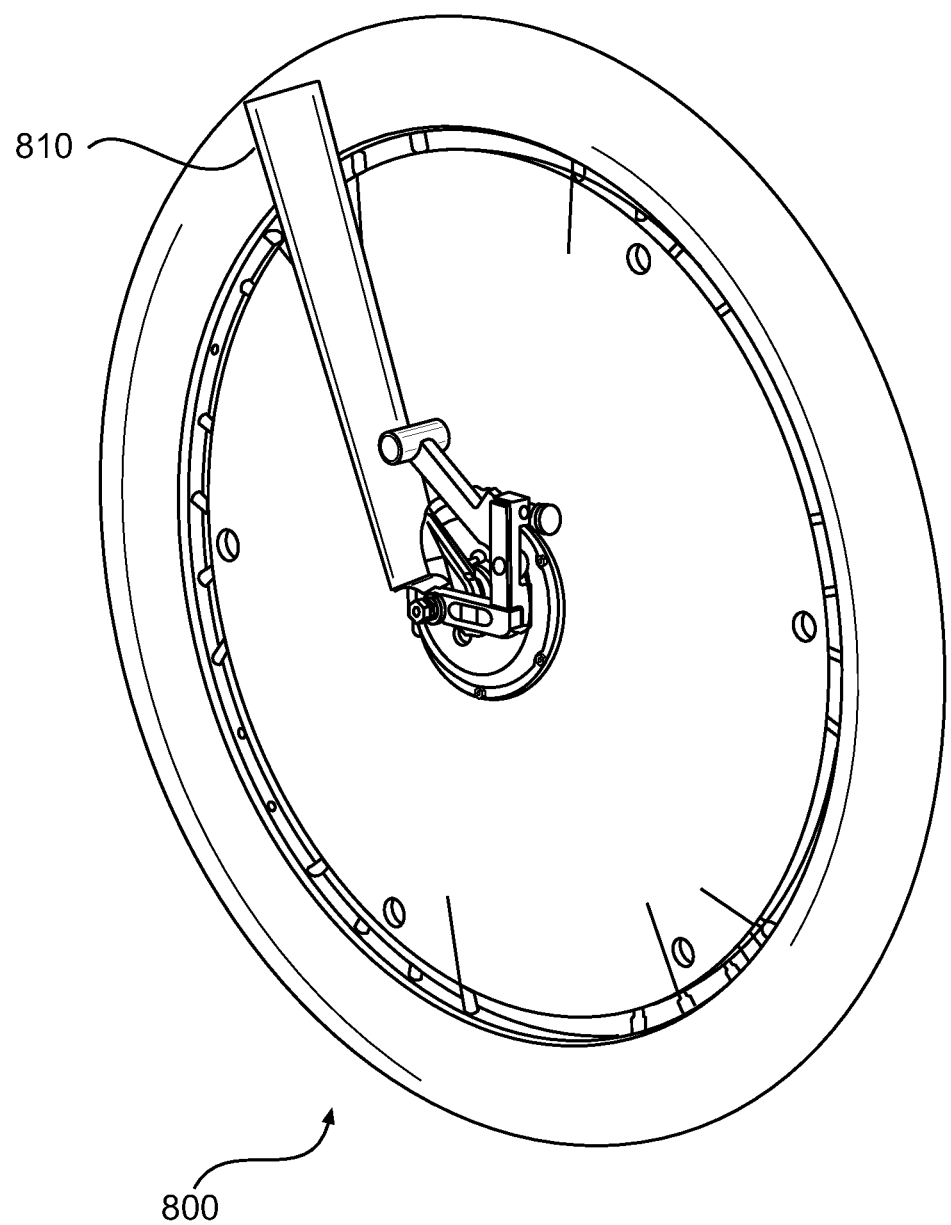
FIG. 8 is a perspective view of an example wheel assembly for an electrical bicycle.

FIG. 8 is a perspective view of an example wheel assembly 800 for an electrical bicycle. As shown, the wheel assembly 800 replaces the front wheel of a conventional bicycle with part of the bicycle frame 810 depicted. A conventional bicycle is a common application for the wheel assembly 800, but other vehicles such as a tricycle, quad-cycle, or other wheeled transportation machine may utilize the wheel assembly.

In another embodiment, an apparatus for detecting rotation of a radial crank member, the apparatus comprising: a sensor housing comprising a member attachment means configured to attach the sensor housing to a radial cycle crank member associated with a crank axis of rotation; a weight disposed within the sensor housing and having a second axis of rotation substantially parallel to the crank axis of rotation, wherein the weight has a center of mass located off the second axis of rotation, and the weight being configured to rotate relative to the housing as the radial cycle crank member rotates; a sensor configured to generate a rotation signal in response to the relative rotation between the weight and the sensor housing; and a wireless transmitter configured to electronically transmit the rotation signal to an electric wheel controller.

In an embodiment, member attachment means to attach the sensor housing to a radial cycle crank member may be continuous straps, non-continuous straps such as those with a hook and clasp, a hose clamp, Velcro®, adhesive tape, and so forth. A crank axis of rotation may refer to the axis of a pedal crank connecting shaft on a convention bicycle. The weight 370 may be placed on an axis of rotation collinear with the rotation sensor 350 axis of rotation, wherein the center of mass of the weight 370 is eccentric. The weight 370 may be adapted to freely rotate as the radial cycle crank member 110 rotates. The weight 370 may also be damped by a friction component or viscous coupling to reduce vibrations caused by road noise, vehicle frame harmonics, or both. As the radial cycle crank member 110 rotates, the weight 370 may maintain a substantially relative fixed position with respect to ground. However, the relative motion between the sensor housing 330,340 and the weight 370 may be motion that the sensor 350 detects. The sensor 350 may be an encoder or a generator in order to produce a rotation signal, such as a voltage, which may have a sinusoid or square waveform. The rotation signal may be conditioned by one or more processors 230 and then electronically transmitted to a receiver 270, or the rotation signal may be transmitted directly to the receiver 270. Signal transmission may occur wirelessly and may be achieved through visible light, infrared light, ultrasonic, radio, microwave, electromagnetic induction, and so forth.

In another embodiment, an apparatus for detecting rotation of a radial crank member, the apparatus comprising: a sensor housing comprising a member attachment means configured to attach the sensor housing to a radial cycle crank member associated with a crank axis of rotation; an accelerometer configured to generate a signal in response to the relative rotation between the radial crank member and the sensor housing; and a wireless transmitter configured to electronically transmit the signal to an electric wheel controller.

While the use of analog information may be described, it is well understood that one of ordinary skill in the art may easily modify the embodiments to use digital information, if so desired, without departing from the spirit and scope of this disclosure.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device for detecting rotation of a bicycle crank, the device comprising:
   a member attachment bracket, an encoder, an encoder shaft, and an eccentric mass, wherein the encoder, having a quadrature output to detect pedaling direction, shares the encoder shaft with the eccentric mass, whereby the encoder is attached to the member attachment bracket which is removably attached to the bicycle crank;
   the encoder provides an electronic measurement of bicycle crank rotation by detecting rotation of the bicycle crank by gravity causing the eccentric mass to maintain its orientation with reference to ground as the bicycle crank rotates, wherein the eccentric mass is adapted to react to discontinued motion of the bicycle crank within a time of 100 ms;
   a battery system operably connected to the encoder; and
   a transmitter to electronically transmit the electronic measurement of bicycle crank rotation.

2. The device of claim 1, wherein the member attachment bracket is adjustable.

3. The device of claim 1, wherein the member attachment bracket is adapted for installation onto the bicycle crank without requiring tools.

4. The device of claim 1, wherein the transmitter is configured for wireless communication.

5. The device of claim 1, wherein the transmitter is configured to transmit the electronic measurement only when a predetermined threshold is achieved in order to reduce battery power consumption.

6. A device for detecting rotation of a bicycle crank, the device comprising:
   a member attachment bracket, an encoder shaft, an encoder, and an eccentric mass, wherein the encoder, having a quadrature output to detect pedaling direction, shares the encoder shaft with the eccentric mass and is removably attached to the member attachment bracket;

the encoder removably attached to the member attachment bracket, wherein the encoder provides an electronic measurement of bicycle crank rotation by gravity causing the eccentric mass to maintain its orientation with reference to ground as the bicycle crank rotates;

a first battery system operably connected to the encoder;

a transmitter for transmitting the electronic measurement of bicycle crank rotation; and a wheel assembly comprising a motor, a second battery system, a receiver for receiving the electronic measurement of bicycle crank rotation, and a control mechanism, wherein the control mechanism is configured to receive the electronic measurement of bicycle crank rotation, and wherein the control mechanism having at least one input from the second battery system, and the second battery system having at least one output to the motor, wherein the eccentric mass is adapted to react to discontinued motion of the bicycle crank within a time of 100 ms and the transmitter transmits the electronic measurement to the control mechanism to alter a power delivered to the motor by the battery system.

7. The device of claim 6, wherein the transmitter and control mechanism are configured for wireless communication.

8. The device of claim 6, wherein the wheel assembly is configured to replace a front wheel of a bicycle and wherein the member attachment bracket is adapted for a bicycle crank.

9. The device of claim 6, wherein the transmitter is configured to transmit the electronic measurement only when a predetermined threshold is achieved in order to reduce battery power consumption.

10. A device for detecting rotation of a bicycle crank, the device comprising:

a member attachment bracket, an encoder, an encoder shaft, and an eccentric mass, wherein the encoder, having a quadrature output to detect pedaling direction, shares the encoder shaft with the eccentric mass, whereby the encoder is attached to the member attachment bracket, and whereby the member attachment bracket is coupled to the bicycle crank with means for removably attaching the device, wherein the encoder provides an electronic measurement of bicycle crank rotation by detecting rotation of the bicycle crank by gravity causing the eccentric mass to maintain its orientation with reference to ground as the bicycle crank rotates, wherein the eccentric mass is adapted to react to discontinued motion of the bicycle crank within a time of 100 ms; and means for wirelessly transmitting the electronic measurement of bicycle crank rotation to a receiver of an electrical bicycle; and a battery system operably connected to the encoder.

* * * * *